May 27, 1958 T. M. SCOTT ET AL 2836,713
TRANSISTOR RADIO RECEIVER TUNING INDICATOR
Filed Aug. 17, 1956
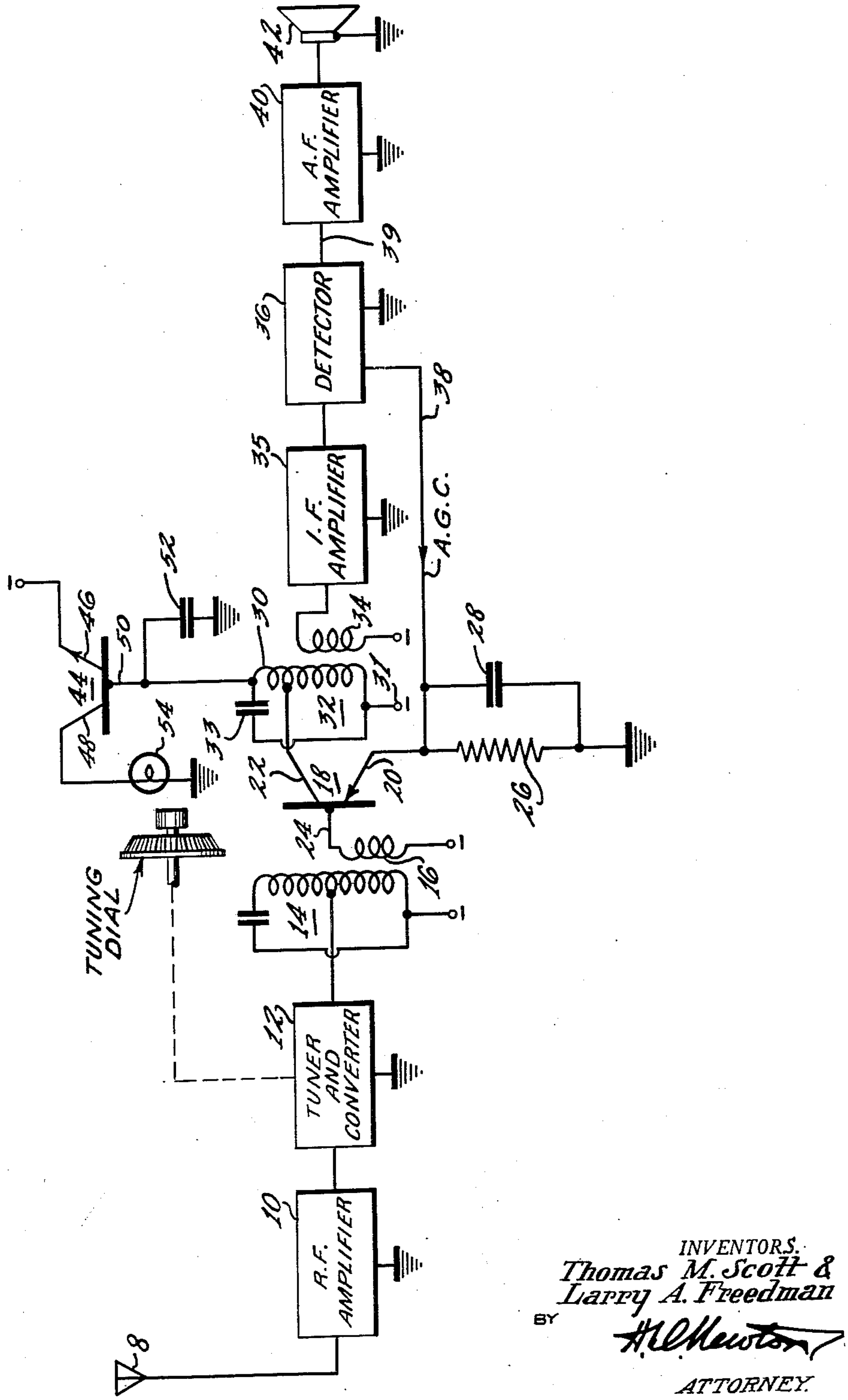
INVENTORS.
Thomas M. Scott &
Larry A. Freedman
BY H. L. Newton
ATTORNEY.

United States Patent Office 2,836,713

Patented May 27, 1958

2,836,713

TRANSISTOR RADIO RECEIVER TUNING INDICATOR

Thomas M. Scott, Princeton, and Larry A. Freedman, New Brunswick, N. J., assignors to Radio Corporation of America, a corporation of Delaware Application August 17, 1956, Serial No. 604,733

7 Claims. (Cl. 250—20)

This invention relates to radio signal receiving systems, and in particular to such systems in which transistors are utilized as active signal amplifying devices.

One of the advantages obtained by the use of transistors in radio signal receiving systems is that the power drain from the supply source is reduced. Most radio signal receiving systems are provided with a dial lamp which illuminates the tuning dial of the receiver. In the conventional type receiver the dial lamp is illuminated when the receiver is turned on and remains illuminated as long as the receiver is in the on condition. In signal receiving systems employing transistors, however, the dial lamp may account for more than half of the no-signal current drain from the supply source, thus counteracting to a substantial degree the small power drain realized by the use of the transistors.

It is accordingly an object of this invention to provide improved means in a transistorized radio signal receiver for illuminating the tuning dial thereof and for reducing the average power drain of the receiver.

Because of cost considerations, most radio signal receivers are not provided with means for visually indicating the tuning of the receiver. It is desirable, however, to provide a receiver with means for accomplishing this function.

It is, therefore, another object of this invention to provide improved circuit means for illuminating the tuning dial of a radio signal receiving system with a minimum amount of power drain and for providing a visual indication of the tuning of the receiver.

The tuning dial lamp of a radio receiver, in accordance with the invention, is illuminated when the receiver is not tuned into a received signal. When the receiver is tuned to an incoming signal, however, the dial light is turned off in response to the automatic gain control (AGC) current of the receiver. Since the receiver is normally tuned to an incoming signal, the dial lamp is normally not illuminated, thus reducing the average power drain. In addition, a visual indication of the tuning is provided as the dial lamp is extinguished. This type operation is achieved, in accordance with the invention, by connecting the tuning dial lamp in the output circuit of an auxiliary transistor which may be referred to as the dimmer transistor. This transistor is connected with the output circuit of one of the transistor amplifiers of the receiver to which the AGC current is applied. The conductivity of the transistor amplifier may be oposite to that of the dimmer transistor. When the receiver is not tuned to an incoming signal, the dial lamp is illuminated by output current flow from the dimmer transistor. When the receiver is tuned to an incoming signal, however, AGC current is applied to the transistor amplifier to reduce its output current which in turn reduces the output current of the dimmer transistor to extinguish the dial lamp.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a schematic circuit diagram, partially in block diagram form, of a radio signal receiving system embodying the invention.

Referring now to the drawing, a superheterodyne signal receiving system includes, as is conventional, an antenna 8, a radio frequency amplifier 10, and a tuner and converter 12, having a tuned output circuit 14. Signals appearing in the output circuit 14 of the tuner and converter 12 are applied through a secondary winding 16, to the base 24 of a transistor I. F. amplifier 18 which is connected to operate in the common emitter configuration. The transistor 18 may be considered to be of the P–N–P junction type and includes, in addition to the base electrode 24, an emitter 20 and a collector electrode 22.

The emitter 20 of the transistor 18 is connected through a negative feedback current stabilizing resistor 26 to ground or reference potential point for the receiver circuit. The resistor 26 is by-passed for signal currents by a capacitor 28. Output signals from the transistor 18 are derived from the collector 22, or from between the collector 22 and the emitter 20. To this end, the collector 22 is connected to an intermediate point of an inductive winding 30 of a tuned output circuit 32, which also includes a tuning capacitor 33. To supply negative biasing potentials to the collector 22, it is connected through the lower half of the output winding 30 to a negative terminal 31 of suitable direct-current supply means such as, for example, a battery (not shown). The intermediate frequency output signals are coupled through a secondary winding 34, which is in inductive coupling relation with the output winding 30, to the input circuit of a second intermediate frequency signal amplifier 35. The output circuit of the second intermediate-frequency amplifier 35 is connected to the input circuit of a signal detector 36. The detector 36 may be, for example, a transistor or a crystal diode and is operative to provide an AGC signal, which may be either as current or voltage, and which is applied through the load 38 to, for example, the emitter 20 of the I. F. transistor amplifier 18. The derived AGC signal may be applied in any well known manner to the transistor 18 to control its gain. The detected audio frequency signal is conveyed from the output circuit of the detector 36 to an audio frequency amplifier 40, as indicated by the circuit connection 39, which drives a suitable loudspeaker 42.

To provide illumination of the dial light of the receiver and a visual tuning indication, in accordance with the invention, the collector 22 of the transistor 18 is connected through the upper half of the output winding 30 to the base 50 of an auxiliary or dial lamp dimmer transistor 44. The dimmer transistor 44 is of an opposite conductivity type to the I. F. transistor amplifier 18 and may be considered to be of the N–P–N junction type. It includes, in addition to the base 50, an emitter 46 and a collector 48. A signal frequency by-pass capacitor 52 is connected from the base electrode 50 to ground which decouples the collector circuit from the common supply. To provide biasing potentials for the transistor 44 the emitter 46 is connected to a suitable negative direct-current biasing supply source. To complete the circuit, in accordance with the invention, a dial lamp 54 which may be of the incandescent type is connected between the collector electrode 48 of the dimmer transistor 44 and ground, as shown. The tuning knob and dial are indicated as being located adjacent the indicator lamp 54.

It is to be noted that the dimmer transistor 44 also serves the function of the usual collector decoupling resistor. Thus this resistor is not needed in the present circuit.

While the transistors 18 and 48 have been illustrated as being of N and P type conductivity, respectively, and are assumed to be of this type conductivity for purposes of the following description of the operation of the circuit, it should be understood that the conductivity of these transistors may be reversed by making the transistor 18 of P type conductivity and the transistor 44 of N type conductivity, as long as the polarity of the appropriate bias supply source is also reversed. In operation, it will be assumed initially that the receiver is not turned to an incoming signal. In the absence of signal input to the receiver, there is no AGC current. In this condition, the direct collector current of the transistor 18 will normally be approximately one milliampere. This one milliampere of current flows into the base electrode 50 of the dimmer transistor 44 to provide amplified direct current flow equal to the product of the collector current flow of transistor 18 and the current gain, as defined by the ratio of collector current to base current of the dimmer transistor 44. If this current gain is equal to sixty (60) for example, and the collector current of the transistor 18 is one milliampere, 60 milliamperes of collector current will flow into the collector 48 of the dimmer transistor 44 and through the dial lamp 54. This current flow is sufficient to fully energize the lamp which, therefore, is normally illuminated or "on" in the absence of an incoming signal.

When the receiver is tuned to an incoming signal, however, the received signal will be amplified and applied to the detector 36, which provides an AGC current in accordance with variations in the amplitude of the received signal, the AGC current increasing with increases in the amplitude of the signal which is applied to the detector 36. This AGC current is applied to the emitter 20 of the I. F. transistor amplifier 18 in the present example, and flows in a direction to reduce the emitter current flow of this transistor. Accordingly, as the signal strength and AGC current increase, the gain of the transistor 18 is reduced. This greatly reduces the direct collector current flow of the transistor 18, which current flows into the base 50 of the dimmer transistor 44. Thus the collector current flow of the dimmer transistor 44 is reduced to one milliampere and will generally be less than one milliampere. This current is insufficient to maintain the lamp 54 in the illuminated or "on" condition so that when the receiver is tuned to an applied input signal the lamp 54 will be extinguished. Since the receiver is normally tuned to the incoming signal, the average dial lamp power drain is greatly reduced yet the lamp is lighted when it is normally used, that is when the receiver is being tuned. In addition, since the dial lamp is operated intermittently, it may be possible to use more than its rated continuous-duty current, resulting in greater luminous efficiency. Moreover, since the lamp is extinguished when the signal which is applied to the detector 36 increases in amplitude, the extinguishing of the lamp 54 provides a positive indication of the tuning function. Thus by using one extra transistor and relatively simple circuit connections, in accordance with the invention, the average power drain of the receiver is reduced and a visual tuning indication is provided.

What is claimed is:

1. In a signal receiving system, the combination with a tuning indicator lamp, automatic gain control means adapted to provide an automatic gain control signal in response to an applied signal, and a transistor signal amplifier having a base, an emitter, and a collector electrode, of an auxiliary transistor having a base, an emitter, and a collector electrode, means connecting the collector electrode of said transistor amplifier with the base electrode of said auxiliary transistor to vary the direct collector current flow of said auxiliary transistor in response to direct collector current variation of said transistor amplifier, means connecting said tuning indicator lamp with the collector of said auxiliary transistor to illuminate said lamp in response to collector current flow of said auxiliary transistor in the absence of an applied signal, and means connecting said automatic gain control means with said transistor amplifier to reduce the gain and the direct collector current thereof and the direct collector current of said auxiliary transistor to extinguish said dial lamp in the presence of an applied signal.

2. In a radio signal receiving system including a tuning indicator lamp, the combination comprising automatic gain control means adapted to provide automatic gain control of said receiving system in response to applied signals, a transistor signal amplifier of one conductivity type having a base, an emitter, and a collector electrode, a lamp dimmer transistor of an opposite conductivity type having a base, an emitter, and a collector electrode, direct-current conductive means connecting the collector electrode of said transistor signal amplifier with the base electrode of said dimmer transistor to vary the collector current flow of said dimmer transistor in response to collector current variation of said transistor amplifier, means connecting said tuning indicator lamp with the collector of said dimmer transistor to illuminate said lamp in response to collector current flow of said dimmer transistor in the absence of an applied signal, and means connecting said automatic gain control means with said transistor amplifier to reduce the gain and the direct collector current thereof and the direct collector current of said dimmer transistor to extinguish said indicator lamp and provide visual tuning indication for said receiver in the presence of an applied signal.

3. In a radio signal receiving system, the combination with a tuning dial and a tuning dial lamp for illuminating said dial, of signal detection means for providing an automatic gain control current in response to an applied signal, a transistor signal amplifier of one conductivity type having a base, an emitter, and a collector electrode, a signal input circuit connected with said base electrode, a signal output circuit connected with said collector electrode, a dial lamp dimmer transistor of an opposite conductivity type having a base, an emitter and a collector electrode, means providing a direct current supply source connected with the collector electrode of said transistor amplifier and the emitter eletcrode of said dimmer transistor for applying biasing potentials thereto, direct-current conductive means connecting the collector electrode of said transistor amplifier with the base electrode of said dimmer transistor to vary the collector current flow of said dimmer transistor in response to collector current variation of said transistor amplifier, direct-current conductive means connecting said tuning dial lamp between the collector of said dimmer transistor and a point of reference potential in said system to illuminate said lamp in response to collector current flow of said dimmer transistor in the absence of an applied signal, and means connecting said signal detection means with the emitter electrode of said transistor amplifier to reduce the gain and the direct collector current thereof and the direct collector current of said dimmer transistor to extinguish said dial lamp and provide visual tuning indication for said receiver in the presence of an applied signal.

4. A radio signal receiving system as defined in claim 3 wherein said transistor signal amplifier is a junction transistor of the P–N–P type, said dimmer transistor is a junction transistor of the N–P–N type, and said direct current supply source is of negative polarity.

5. In a signal receiving system including a tuning indicator lamp, the combination with automatic gain control means for providing automatic gain control of said system in response to applied signals, a transistor signal amplifier, and means providing a signal output circuit connected with said transistor amplifier, of an auxiliary transistor, direct-current conductive means connecting said output circuit with said auxiliary transistor to vary the current flow of said auxiliary transistor in response to output current variation of said transistor amplifier, means connecting said tuning indicator lamp with said auxiliary transistor to illuminate said lamp in response to current flow of said auxiliary transistor in the absence of an applied signal, and means connecting said automatic gain control means with said transistor amplifier to reduce the gain and the output current thereof and current of said auxiliary transistor to extinguish said dial lamp in the presence of an applied signal.

6. A tunable signal translating system comprising, in combination, a tuning indicator lamp, at least one signal translating stage including a transistor signal amplifier having base, emitter, and collector electrodes, an auxiliary dimmer transistor having base, emitter, and collector electrodes, means providing automatic gain control of said system responsive to applied signals, means connecting said automatic gain control means with said transistor amplifier to control the gain and the collector current thereof inversely relative to the strength of an applied alternating current signal, means connecting said indicator lamp in circuit with the collector of said dimmer transistor to illuminate said lamp in the absence of an applied signal, and means connecting the collector of said transistor amplifier with the base of said dimmer transistor to control the collector current of said dimmer transistor inversely relative to the strength of an applied alternating current signal to effectively extinguish said lamp in the presence of an applied alternating current signal.

7. A signal receiving system as defined in claim 6 wherein said transistors are of opposite conductivity types.

References Cited in the file of this patent

UNITED STATES PATENTS

| | | |
|---|---|---|
| 1,887,329 | Schade | Nov. 8, 1932 |
| 2,125,468 | Sinninger | Aug. 2, 1938 |
| 2,514,327 | Grant | July 4, 1950 |
| 2,663,800 | Herzog | Dec. 22, 1953 |
| 2,666,818 | Shockley | Jan. 19, 1954 |